April 14, 1953  D. D. TOTI  2,634,456
FOWL PICKER HEAD
Filed May 24, 1948
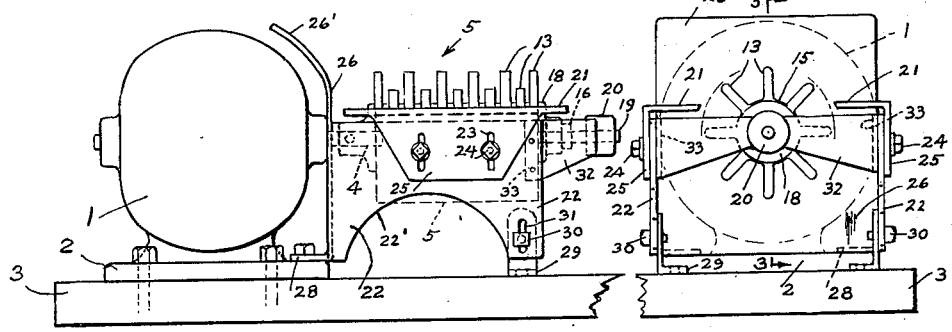
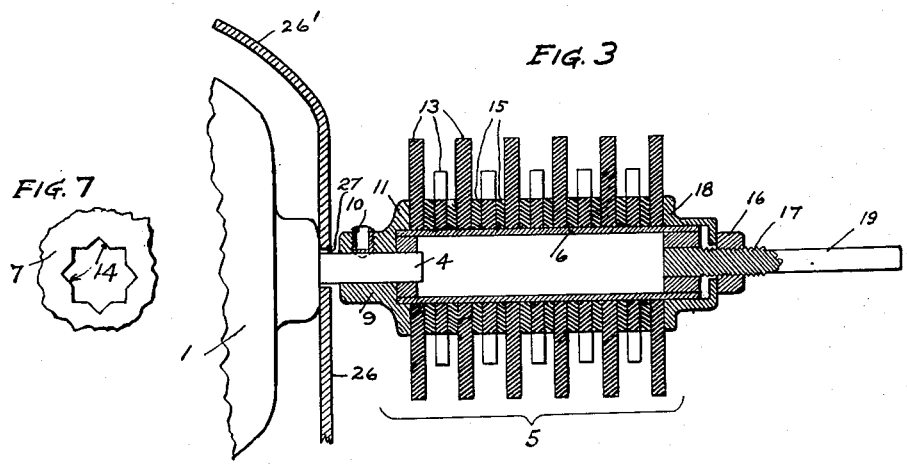
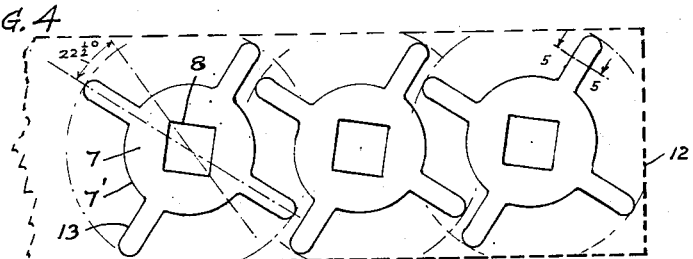
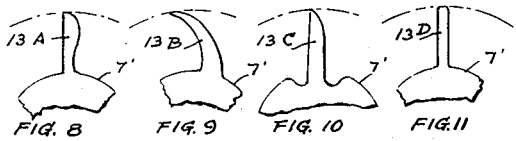
INVENTOR
DANTE D. TOTI
BY
ATTORNEY Patented Apr. 14, 1953

2,634,456

UNITED STATES PATENT OFFICE 2,634,456

FOWL PICKER HEAD

Dante D. Toti, Modesto, Calif., assignor, by decree of distribution, to Rina Toti, Modesto, Calif.

Application May 24, 1948, Serial No. 28,841

6 Claims. (Cl. 17—11.1)

This invention relates to power driven apparatus for plucking the feathers from table fowl generally and has for its principal object an inexpensive picker head, and one adapted to be directly mounted upon an ordinary projecting electric motor shaft to form a complete unit therewith.

Other features and advantages of the invention will appear in the following description and in the accompanying drawings.

In the drawings:

Fig. 1 is a side elevation of my improved picker head mounted on the shaft of an electric motor ready for use in removing the feathers from any kind of fowl.

Fig. 2 is an end view of Fig. 1 looking toward the picker head.

Fig. 3 is an enlarged longitudinal central vertical cross section of the picker head taken along the line 3—3 of Fig. 2 and showing its connection to the motor shaft.

Fig. 4 is a plan view of three of the picker disks showing how they are cut or died out of a flat strip of rubber or the like.

Fig. 5 is a cross section of one of the picker fingers.

Fig. 6 is a cross section of an optional cross sectional form of the picker fingers.

Fig. 7 is a central fragment of a picker disk with a special driving aperture formed in it.

Figs. 8, 9, 10 and 11 show different forms of picker fingers for various kinds of fowls.

In further detail, the drawings show an electric motor 1 having a base 2 bolted or otherwise secured to a bench 3 or other support.

The motor is shown as an ordinary stock motor having a projecting power shaft 4 to which my picker head 5 is secured for direct rotation therewith at the motor speed—preferably about 1700 R. P. M.

The picker head comprises a supporting shaft 6, preferably a tubular one for lightness and preferably square, hexagonal or other angular external shape to prevent rotation thereon of the picker disks 7 which are centrally apertured as at 8 to fit thereover.

The shaft is provided at its inner end with a fixed driving hub 9 fitting on the motor shaft 4 and provided with any suitable means for securing it thereto, such as one or more countersunk set screws as indicated at 10, and the hub is preferably formed with a circular flange 11 bearing against the inner one of the picker disks.

The picker disks are best shown in Fig. 4 and while they may be molded, they are preferably cut or died out of a flat sheet 12 of soft rubber, preferably from ⅛ to ½ inch thick (though they may be much thicker for a large machine) and preferably the disk has a relatively large round central hub 7' with several spokes or "fingers" 13 projecting about 1½ or 2 inches outwardly from it. I have found four spokes evenly spaced to be very satisfactory and preferably each disk is given an eighth turn on the shaft to bring the spokes of one disk intermediate the spokes of the two adjacent disks. This is easily done on an octagonal shaft where the central holes in the disks are octagonal, and also on a square shaft if the spokes radiate on lines ⅛ of a circle (22½°) off of the corners of the square shaft as shown in Fig. 4, if every other disk is reversed, though if the disks have an eight cornered opening punched in them as shown at 14 in Fig. 7 they do not need reversing to stagger the spokes when assembled.

Ordinarily it is not necessary to space the disks, as the staggering of the spokes is sufficient to permit proper stripping action on the feathers of the fowl, but for large picker heads there may be a spacing washer 15, as of rubber, plastic, metal or other suitable material, though lightness is an important factor where no outboard bearing is used. The washers should preferably be the same diameter as the hubs 7' to form a continuation of the hubs 7' for the length of the assemblage.

The picker disks, and washers if used, are all clamped together by a nut 16 screwed over a threaded solid extension 17 of the hollow shaft 6 bearing against a loose flange hub 18 apertured to fit the exterior shape of the hollow shaft 6.

Where an outboard bearing is required, as in the larger sizes of picker heads, the shaft 17 is extended in reduced diameter as at 19 to operate in an optional outboard bearing 20 to be described, but for small pickers the shaft is omitted outwardly of nut 16.

As the relatively small diameter and high speed of revolution of the picker head tends to wind a fowl or its neck or wings about the rotor if pressed too hard against it, the solid round hub formed by the combined edges of the washers 15 if used and/or the disk hubs 7' just about an inch and a half or two inches below the active outer ends of the spokes or fingers is important in preventing this objectionable effect to a great extent, but in addition to aid in overcoming this objection I prefer to provide a shelf or bumper close to and along one or both sides of the picker head, particularly the downwardly revolving side where parts of the fowl would wind under. These shelves are shown best at 21 in Fig. 2 and are vertically adjustable on side plates 22 by means of slots and bolts 23, 24 passing through right angle downwardly extending arms 25.

The side plates 22 are preferably extensions of a fixed motor guard plate 26 which is apertured to pass the motor shaft as indicated at 27 in Fig. 3 and curved toward and over the motor as at 26' at its upper end, and preferably bent rearwardly at its lower end to form a flange 28 bolted or otherwise secured to the motor base 2 so as to make a portable self contained unit with the motor.

Preferably there are a couple of legs 29 secured to the outer ends of plates 22 vertically adjustable there against as by bolts and slots 30, 31 to take up any unequality of the bench surface, and the plates 22 are cut away as at 22' for any feathers to get out.

The outboard bearing 20 if used may be of any type and is secured to and carried by a cross plate or brace 32 having its ends 33 bent at right angles and bolted or otherwise secured to the side plates 22.

In considering the foregoing description, it should be noted that the picker disks may be made of any flexible high friction material such as soft rubber, natural or synthetic, and with or without fibrous reinforcements, or soft leather will give results but should be waterproofed, if prescalded fowl are run over the machine.

In operation, an operative holds the fowl against the top of the revolving picker head and manipulates it in various directions and turning it over and end for end to bring the action of the revolving picker head against all of the feathers, which are thereby immediately removed to pass over the top of the shelf toward which the upper ends of the fingers are moving.

It should also be noted, that while I show and prefer to make the picker disks with four projecting spokes, there may be more or fewer spokes on each disk. Also their outer ends may be rounded or otherwise, as variously shown in Figs. 7, 8, 9 and 10, at 13A, 13B, 13C, and 13D.

Having thus described my improved fowl picker head what I claim is:

1. For a rotary fowl picker head of the character described, a series of flat soft rubber disks each formed with a plurality of spokes projecting freely outward from the edges of the disks and having a central non-circular aperture for a driving shaft arranged to permit staggering of the spokes of alternate disks when mounted on a complementary shaped drive shaft.

2. A rotary fowl picker head adapted for direct connection to an electric motor shaft, comprising a supporting shaft provided at one end with means for connecting it to the motor shaft, a series of flat disks formed of soft flexible friction material with freely projecting spokes at their peripheries, the disks centrally apertured and assembled on said supporting shaft, a guard plate of a size to cover the end of the motor and apertured to pass the motor shaft, and means securing the guard plate to the motor, an upright side plate extending from the guard plate alongside the picker head, and a shelf carried by said side plate extending close to the outer ends of the spokes of the disks when the head is rotated.

3. In combination with an electric motor having an extending shaft, a rotary cylindrical picker head comprising hub means with freely projecting soft flexible spokes around it mounted on a supporting shaft, means connecting one end of the supporting shaft to the motor shaft, a guard plate apertured for the motor shaft arranged to cover the end of the motor adjacent its extending shaft, a pair of shelves extending from the guard plate respectively along opposite sides of the picker head close to the ends of the spokes, and means supporting the guard plate and the shelves from the motor to form a self contained unit therewith.

4. In a structure as set out in claim 3 vertical side plates supporting said shelves, a cross brace connecting the outer ends of the side plates, and an outboard bearing for the supporting shaft carried on said cross brace.

5. A fowl picker head of the character described, comprising an assemblage of flat picker disks mounted on a supporting shaft, said shaft being relatively large in diameter with respect to the disks and hollow and formed with an exterior shaped for engaging apertures in said disks against individual rotation, shaft coupling means carried by one end of said shaft adapted for connection to a motor shaft, a flange adjacent said one end of the shaft and against the assemblage of disks, and adjustable flange means at the opposite end of the hollow shaft holding said assemblage in compressed relation, the assemblage of picker disks forming a hub, and relatively short soft flexible spokes projecting freely all around said hub.

6. A rotary fowl picker, comprising an electric motor having a projecting shaft and a base, a cylindrical picker head provided with a shaft directly connected to the motor shaft, a shelf extending along one side of and close to the picker head for resting a fowl thereagainst during the picking operation, and means supporting said shelf from the motor structure so as to form a unit therewith and the picker head, all carried by the motor.

DANTE D. TOTI.

References Cited in the file of this patent
UNITED STATES PATENTS

| Number | Name | Date |
|---|---|---|
| Re. 16,204 | Ramstetter et al. | Nov. 10, 1925 |
| 367,075 | Todd | July 26, 1887 |
| 1,372,595 | Bouda | Mar. 22, 1921 |
| 2,194,032 | Shepherd | Mar. 19, 1940 |
| 2,314,700 | Hanshaw | Mar. 23, 1943 |
| 2,362,371 | Haist | Nov. 7, 1944 |

FOREIGN PATENTS

| Number | Country | Date |
|---|---|---|
| 116,705 | Austria | Mar. 10, 1930 |